United States Patent [19]

Federspiel

[11] B 3,985,039
[45] Oct. 12, 1976

[54] TRANSMISSION CONTROL BRAKE
[75] Inventor: Joseph A. Federspiel, Port Washington, Wis.
[73] Assignee: FMC Corporation, San Jose, Calif.
[22] Filed: Aug. 13, 1974
[21] Appl. No.: 497,021
[44] Published under the second Trial Voluntary Protest Program on January 13, 1976 as document No. B 497,021.

[52] U.S. Cl. .................................. 74/481; 74/482; 74/531; 74/478; 74/474
[51] Int. Cl.² .................... G05G 11/00; G05G 5/06; G05G 9/00
[58] Field of Search ............. 74/531, 481, 482, 513, 74/474, 478

[56] References Cited
UNITED STATES PATENTS

| 2,427,103 | 9/1947 | Hettinger | 74/531 |
| 2,867,133 | 1/1959 | Ewing | 74/531 |
| 2,971,397 | 2/1961 | Bunting | 74/531 X |
| 3,505,896 | 4/1970 | Phillips | 74/481 |
| 3,727,482 | 4/1972 | Geer | 74/531 |
| 3,837,235 | 9/1974 | Peterson | 74/531 |

Primary Examiner—Samuel Scott
Assistant Examiner—P. S. Lall
Attorney, Agent, or Firm—C. E. Tripp; A. J. Moore; R. B. Catto

[57] ABSTRACT

The foot-operated speed control shaft for the hydrostatic transmission of a garden tractor is provided with an operating handle which is pivoted on the shaft for fore and aft movement, and is slightly flexed laterally. This flexure energizes a friction block which is secured to the handle and slides across a fixed braking surface to arrest the control shaft in any selected rotative position. The upper part of the operating handle includes a tube enclosing a spring-loaded plunger and rod. The rod has a lower end extending past the edge of a quadrant which is secured to the control shaft. According to the position of the plunger, the rod end can be either seated within a notch in the edge of the quadrant, or can be locked out of contact with the notch. Since the quadrant is attached to the control shaft, the two control systems, i.e., the normal foot pedal control and the present handle operated control, are connected together, or disconnected, according to the operative position of the plunger and rod, and the hand control system may be overridden by the foot control system if necessary.

14 Claims, 7 Drawing Figures

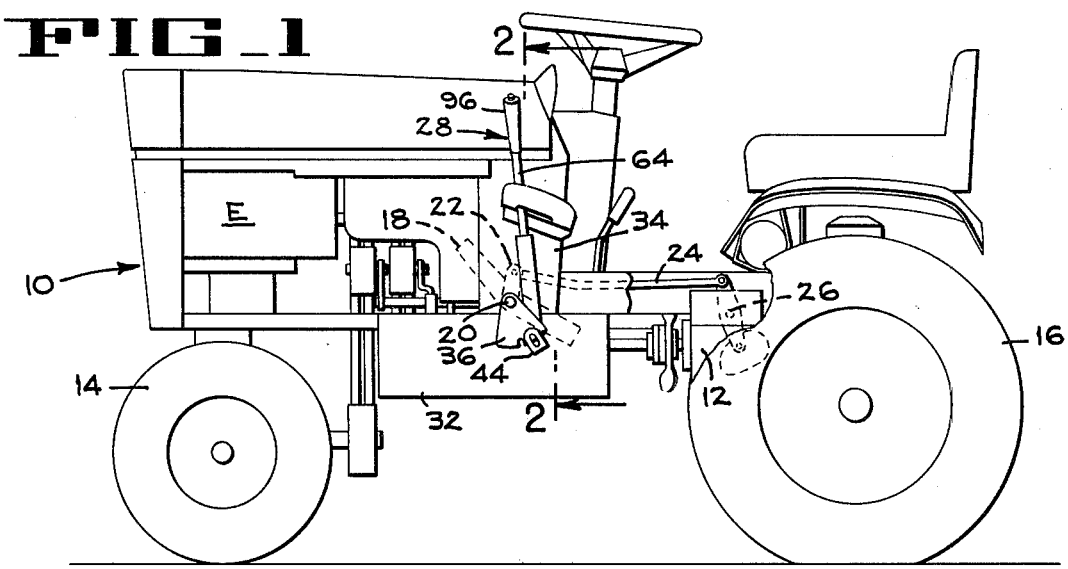
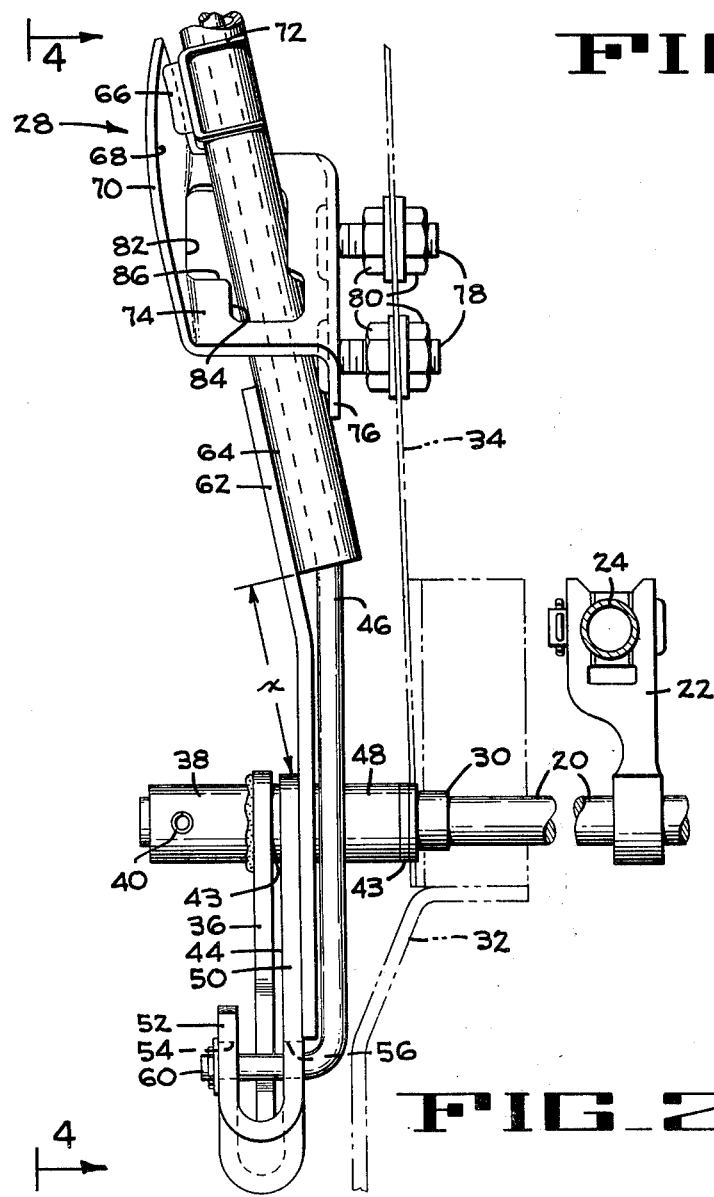
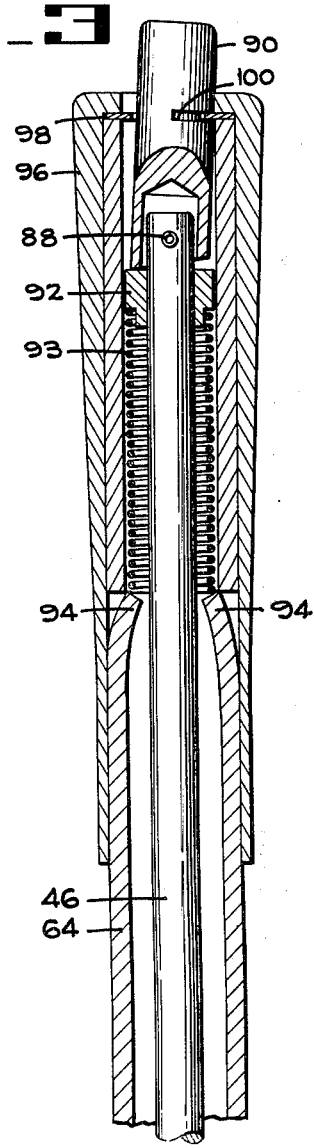

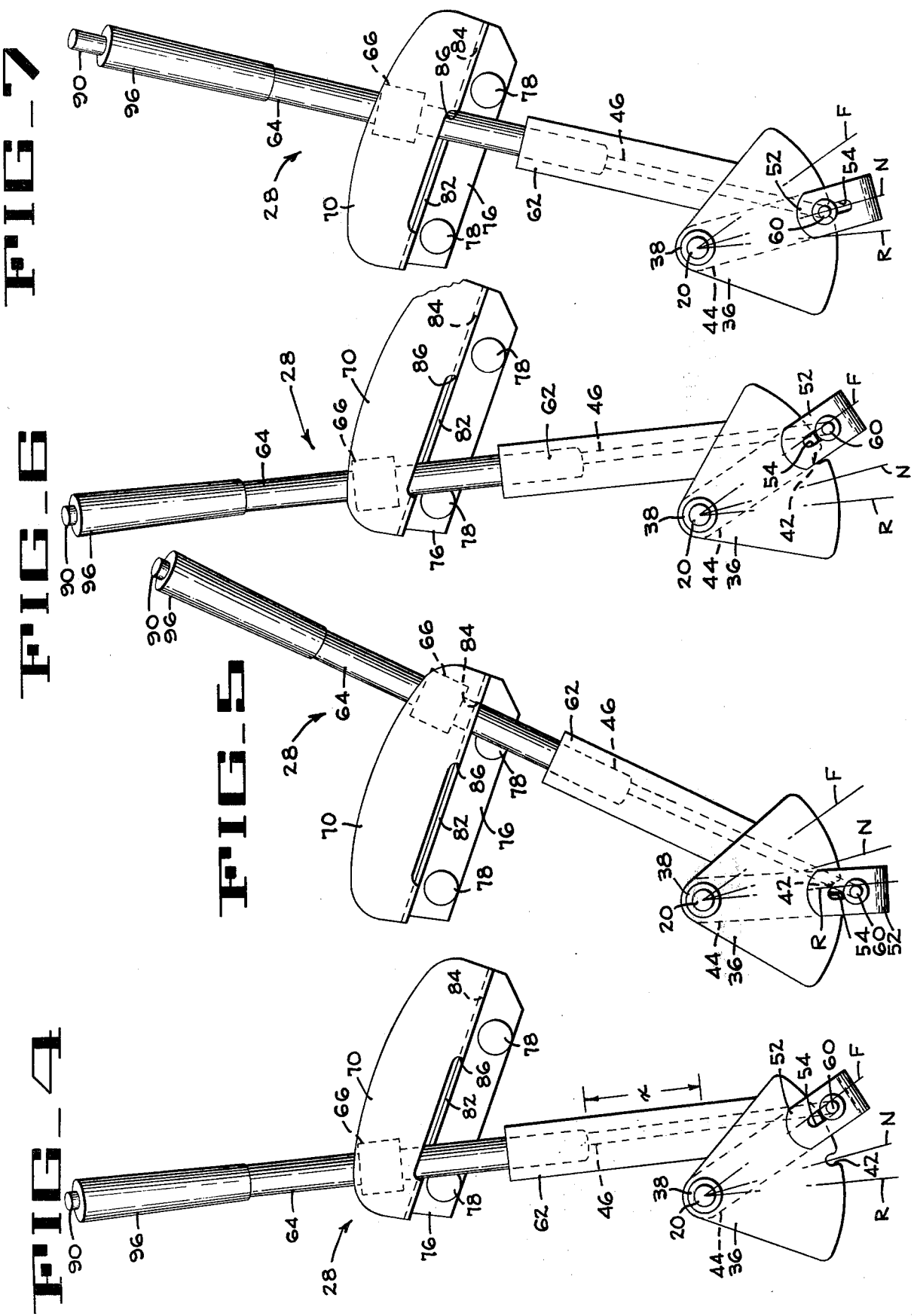

TRANSMISSION CONTROL BRAKE

BACKGROUND OF THE INVENTION

The field of the present invention particularly concerns small garden tractors which include hydrostatic transmissions for controlling the speed, direction and pulling power of the tractor. The transmission is provided with a rotatable control shaft which may be indirectly connected to a rocking foot pedal so that the control shaft is rotated in one direction when the pedal is rocked forward to effect forward motion of the tractor, and is rotated in the opposite direction when the pedal is rocked rearward for reverse motion. The speed of the tractor is proportional to the amount the foot pedal is depressed, while the engine is operated at a speed set by a conventional throttle device, the details of which do not directly affect the present invention.

A prior art control system of the type indicated is shown, for example, in the U.S. Pat. No. 3,505,896 issued to Phillips on Apr. 14, 1970, and assigned to the assignee of the present invention. For the operator's convenience when the transmission setting does not require changing for an extended period of time, the patented structure provides a temporary locking mechanism on the shaft to which the rocking foot pedal control for the transmission is attached. The locking mechanism comprises a second foot pedal with a grooved undersurface for receiving a sector of a disc connected to the shaft. The disc and groove are so shaped that they may be wedged together by forcefully depressing the locking foot pedal, thus allowing both the directional foot pedal and the locking foot pedals to be released while the transmission retains its set position. If the directional foot pedal is again actuated, the relative movement between the disc and groove causes them to disengage so that the locking mechanism is ineffective until it is again set by depressing the locking foot pedal.

It has been found in actual use that a locking device of the type described is not always effective for its intended purpose, in that the device sometimes disengages if the tractor is subjected to extreme jolts or vibration in operation. A further disadvantage is that, as a safety precaution, it is desirable that a transmission locking device be inoperative when the transmission is in a reverse driving mode, and this is not possible with the patented locking device. A feature lacking in the patented device and provided by the present system is that as a further safety precaution, it is desirable to have the locking device capable of being positively connected or disconnected to prevent its accidental use. The latter capability is also a convenience feature because of the relatively infrequent use of the locking device in many working conditions. In contrast to the relatively positive locking arrangement in the Phillips patent, supra, the present invention provides a brake assembly which will maintain the control shaft of the transmission in a selected position, but which can be manually overridden if the need arises by the foot pedal.

SUMMARY OF THE INVENTION

By employing a quadrant on the shaft to which the rocking foot pedal control is mounted, and an elongate laterally flexed handle, freely pivotally mounted on said shaft and having a locking rod selectively engageable with the quadrant, a friction block on the handle at a substantial distance from the shaft is biased against a braking surface by the flexure of the handle. Thus, the braking effect at the friction block can be relatively small to arrest the shaft in a selected position because of the relatively long lever arm between the friction block and the quadrant shaft. Yet, the brake is little affected by vibration, and the brake can be readily overridden if the rocking foot pedal is actuated, either in an emergency situation, or under normal working conditions. The handle extends through an apertured selector plate to prevent the brake system from being operated when the transmission is in reverse. The brake system can also be positively made either active or inactive, when the transmission is in a forward driving mode, by coupling or uncoupling it to the quadrant, and the flexible handle eliminates external springs which can be dislodged or broken.

BRIEF DESCRIPTION OF THE DRAWINGS

FIG. 1 is a side elevation of a garden tractor and the hand operated transmission control brake of the present invention.

FIG. 2 is an enlarged vertical section taken along lines 2—2 on FIG. 1, part of the conventional existing structure being shown in phantom lines.

FIG. 3 is an enlarged sectional view of the upper portion of the control handle shown in FIG. 2.

FIG. 4–7 are diagrammatic elevations taken in the direction of lines 4—4 on FIG. 2, and illustrate various operational positions of the brake assembly.

DESCRIPTION OF THE PREFERRED EMBODIMENT

The brake assembly of the present invention is particularly useful with the transmission controls of a small garden tractor 10 (FIG. 1) of the type including a hydrostatic transmission 12 coupled to an engine E. The tractor is supported by steerable front wheels 14 and driven rear wheels 16, and is controlled by means including a rocking foot pedal 18 on the right hand side of the vehicle. A transverse shaft 20 supports the foot pedal 18.

A control linkage including a crank arm 22 on the shaft 20, plus an elongate rod 24 which is coupled to the crank arm and to a rotatable control shaft 26 of the transmission, causes the transmission control shaft 26 to rotate proportionately to the amount and the direction in which the foot pedal is moved, and directly alter the output of the transmission. Thus, the foot pedal 18 regulates the direction and speed of the tractor, while a throttle control, not shown, sets the engine speed. The throttle will, of course, also vary the ground speed, but is usually set at a fixed position for most working conditions.

In order to maintain the selected operational position of the control shaft 26 when an extended operating period is anticipated during forward movement with no substantial change in speed or torque requirements, the present invention provides a hand operated brake assembly or locking mechanism 28 for the transmission controls. The braking action is positive inasmuch as, once set, the brake assembly 28 will maintain the position of the transmission controls without attention, but on the other hand is capable of being overridden by operator actuation of either the foot pedal, or of the handle of the brake assembly. On most garden tractors, wheel brakes are used which will override the foot pedal control and return the pedal to a neutral position.

Thus, if the operator is using the brake assembly 28, but encounters a situation requiring either vehicle braking, or a change in the foot pedal position, either action will override the brake assembly 28.

With reference now to FIGS. 2 and 4, the foot pedal shaft 20 extends across the tractor from the right-hand foot pedal 18 (FIG. 1) which governs the transmission 12, and projects from a bearing 30, on the frame 32, through a side wall 34. The outer end portion of the shaft 20 at the left hand side of the tractor carries a quadrant 36 having an integral hub 38 which is locked on the shaft 20 by a roll pin 40; the quadrant is therefore, in effect, a driven arm relative to the shaft 20 when the shaft 20 is rotated by rocking the foot pedal 18.

Thus, the quadrant 36, as viewed in FIG. 4, turns counterclockwise with the shaft 20, when the forward end of the foot pedal 18 is depressed, to condition the transmission for forward movement of the vehicle. When the foot pedal is rocked in the other direction, the quadrant 36 and shaft 20 rotate clockwise. When a notch 42 in the edge of the quadrant is angularly positioned relative to the shaft 20 as illustrated in FIG. 4, the transmission is in neutral as indicated by the reference line N. Full forward and full reverse positions of the quadrant are obtained when the notch 42 is aligned with the reference line F or R, respectively, and result in forward or reverse movement of the tractor. With a set engine speed, the tractor speed increases uniformly when the quadrant is moved in either direction from neutral.

Mounted on the shaft 20 (FIG. 2) between the bearing 30 and the quadrant 36, and between thrust washers 43, is a J-shaped latch arm 44 for supporting one end of a locking rod 46. The latch arm includes an integral hub 48 which is freely pivotable with the arm on the shaft 20 and is thus, in effect, an idler arm relative to the shaft 20. Near the curved portion interconnecting the long leg 50 and the short leg 52 of the latch arm 44 are aligned, coextensive slots 54 and 56 which guide a laterally directed lower end locking segment 60 of the locking rod 46 for movement toward and away from the axis of the shaft 20.

As later described, the locking rod 46 is selectively biased upward by spring means so as to seat within the notch 42 in the quadrant 36 when the latch arm is positioned to place the locking segment radially opposite the notch. When the quadrant notch 42 and locking segment 60 are thus engaged, at the option of the operator, rotation of the shaft 20 (by the foot pedal 18, FIG. 1) causes unitary movement of the quadrant 36 and the latch arm 44.

The lower portion of a flat carbon steel spring 62 (FIGS. 2 and 4) overlies and is welded to the inward side of the long leg 50 of the latch arm 44. The upper portion of the spring 62 is welded to an upstanding tubular handle 64, leaving the spring length indicated by the dimension line *x* (FIGS. 2 and 4) capable of free lateral flexure. The spring 62 and the handle 64 thus form, in effect, a flexible extension arm of the latch arm 44. As installed, the upper portion of the spring 62 (FIG. 2) in slightly flexed toward the side wall 34 thus tending to move outwardly away from the side wall 34. This flexure maintains a rubber friction block 66 in pressure-engagement with the friction braking surface 68 (FIG. 2) of a flat brake shoe panel 70. The friction block 66 is secured to a bracket 72 that is clamped to the handle 64.

Any given angular position of the latch arm 44 relative to the axis of the shaft 20 tends to be maintained because of the frictional engagement of the friction block 66 with the braking surface 68. Because the effective lever arm distance of the friction block 66 from the shaft 20 is substantial, only a relatively light outward resilient force of the flat spring 62 is required for pressure energization of the brake assembly to immobilize the latch arm 44 and the quadrant 36 when the arm and quadrant are connected together by the locking rod segment 60 being seated within the quadrant notch 42.

In order to preset the energizing pressure of the brake assembly 28, the brake shoe panel 70 (FIG. 2) and an apertured selector plate 74 integrally formed therewith are provided with a base flange 76. Two threaded bolts 78 are secured to the flange 76 and project through the side wall 34. By axially adjusting and tightening double nuts 80 which straddle the side wall 34, the brake shoe panel can be moved toward or away from the friction block 66 to provide the required frictional brake force by lateral flexure of the spring 62.

As best shown in FIG. 2, the handle 64 extends through a large (forward) aperture 82 which merges with a smaller laterally offset (rearward) aperture 84 in the selector plate 74. The apertures 82 and 84 respectively correspond to a forward driving mode, and to a reverse driving mode, under certain conditions which are next described. When the latch arm 44 and the quadrant 36 are latched together by the locking rod segment 60, the handle 64 moves fore and aft within the aperture 82 in all positions of the quadrant which correspond to forward motion of the tractor. If the foot pedal 18 (FIG. 1) is then actuated to move the control shaft 26 of the transmission 12 past neutral toward a reverse operating mode, the quadrant 36 swings the handle 64 toward the selector plate aperture 84, but an abutment corner at 86 blocks entry of the handle into the aperture 84. The transmission cannot be placed in a reverse operating mode until the quadrant 36 and the handle 64 are disconnected or the handle is manually moved into the aperture 84, because the quadrant 36 must rotate clockwise farther than the handle 64 will be allowed to travel by the abutment 86 at the corresponding end of the selector plate aperture 82.

To provide for the previously mentioned selective connection or disconnection of the latch arm 44 (FIG. 4) and the quadrant 36, the locking rod 46 (FIGS. 2 and 3) extends upward through the tubular handle 64 and is connected by a pin 88 to an operating plunger 90. Beneath the plunger 90 a spring centering collar 92 is engaged with a compression spring 93, the lower end of which bears against two opposed tabs 94 which are integrally formed, and bent inward, from the tubular handle 64.

Between the upper end of the handle 64 and a cover grip 96 is a washer 98. One side of the plunger 90 is provided with a slot 100 positioned, relative to the pin 88, so that the plunger 90 can be pivoted laterally about the pin to engage an inner segment of the washer 98 with the slot 100 when the plunger is in a depressed position. This will maintain the plunger depressed unless the operator returns the plunger to alignment with the rod 46 to disengage the washer.

In the depressed position of the plunger shown in FIG. 3, the locking segment 60 (FIG. 4) of the rod 46 is free of the quadrant notch 42, thus disconnecting the latch arm 44 from the quadrant 36 and positively rendering the brake assembly inactive to control the quadrant. On the other hand, if the plunger 90 (FIGS. 3 and 7) is released and the latch arm 44 is moved by actuation of the handle 64 to align the locking rod segment 60 with the notch 42 in the quadrant 36, the spring 93 causes the locking rod segment to seat in the notch. The latch arm 44 and the quadrant 36 will then move coextensively together about the axis of the shaft 20, but the friction block 66 will resist such movement.

It should be noted that coextensive movement of the latch arm and quadrant may originate with either manual actuation of the handle 64, or with movement of the quadrant 36 by rocking the foot pedal 18 (FIG. 1). In either case, the friction block 66 resists vibrational movement of the handle 64 out of the desired preset position thereby maintaining a constant output condition for the transmission. However, it will be understood that the brake assembly 28 will yield to an overriding force applied either via the foot pedal or to a direct resetting force applied to the handle.

FIGS. 3 and 5 illustrate a condition where the plunger 90 has been locked down to release the locking segment 60 from the quadrant notch 42 and free the latch arm 44 for free movement with the shaft 20. When the plunger is locked down, the transmission may be controlled only by the foot pedal 18 (FIG. 1).

It is also possible to lock out the brake assembly 28 when the transmission is in a forward drive mode, as illustrated by FIG. 6, merely by pushing down and locking the plunger 90 so that the locking segment 60 is withdrawn from the quadrant notch 42. Later, and provided that the transmission is in a forward driving mode, the brake assembly 28 can be reactivated at any time by releasing the plunger so that the locking segment 60 rides against the arcuate edge of the quadrant, and by then swinging the handle 64 until the locking segment 60 snaps into the quadrant notch 42.

When the latch arm 44 is connected to the quadrant 36 as illustrated in FIG. 7, it will be appreciated that the handle 64 may be used to adjust the transmission into an infinite number of forward or reverse positions, but is capable of locking the transmission only into desired forward positions. When moving the handle 64 into the reverse slot 84 (FIG. 2) the operator must first move the handle inwardly toward the wall 34 and then past the abutment 86 (FIG. 2). Thus, when the arm and quadrant are connected together, the friction lock 66 will lock the transmission in any one of an infinite number of forward positions but not in any reverse positions because the reverse slot 84 holds the friction block 66 away from the brake surface 68 when the handle is in the reverse position.

In FIG. 7 the locking rod segment 60 is seated in the quadrant notch 42, and the handle 64 is positioned relative to the selector plate apertures 82 and 84 (FIG. 2) so that it is seated against the abutment 86. This position places the quadrant 36 and the transmission 12 (FIG. 1) in a neutral position. If either the handle 64 is pushed forward or the foot pedal 18 (FIG. 1) is rocked forward, the shaft 20 rotates (counterclockwise) to cause forward movement of the tractor, and either the handle 64 or the foot pedal 18 can be actuated in the opposite direction to return the transmission to neutral. As previously mentioned, however, the transmission will remain in neutral until the latch arm 44 is freed by releasing the locking rod segment 60 from the quadrant notch 42, and then rocking the foot pedal for reverse movement, or by laterally flexing the handle 64, with the latch arm connected to the quadrant, and then pulling the handle into the selector plate reverse aperture 84.

Although the best mode contemplated for carrying out the present invention has been herein shown and described, it will be apparent that modification and variation may be made without departing from what is regarded to be the subject matter of the invention.

What is claimed is:

1. In a control mechanism for the hydrostatic transmission of a tractor of the type including a rocking foot pedal and a pedal support shaft rotatable by actuation of said pedal to indirectly alter the output torque, driving direction and speed of said transmission, the improvement comprising:
    a. a quadrant fixed to said support shaft;
    b. a locking rod pivotally connected to said support shaft and releasably connected to said quadrant for movement therewith;
    c. a friction pad carried by said locking rod; and
    d. a fixed braking surface slidably engaged by said friction pad for braking said support shaft to retain a given rotative position of said shaft when said foot pedal is released, said shaft being movable by pressure on said foot pedal.

2. In a control mechanism for the control shaft of a hydrostatic transmission which is rotatably positioned to alter the operating conditions of the transmission, a selectively operable passive brake for said shaft comprising:
    a. a quadrant fixed to said shaft;
    b. a latch arm pivotally mounted on said shaft and releasably connected to said quadrant;
    c. a resilient flexible spring secured to said latch arm;
    d. a first brake element connected to said spring in spaced relation to the axis of said shaft; and
    e. a second brake element slidably engaged by said first brake element, said spring being flexed to provide the braking pressure between said brake elements.

3. In a control mechanism for the hydrostatic transmission of a tractor including a rocking foot pedal mounted on a shaft which is rotatably positioned by the foot pedal to alter the speed, direction and torque outputs of the transmission, the improvement comprising:
    a. a quadrant fixed to said shaft;
    b. a latch arm pivotally mounted on said shaft and releasably connected to said quadrant;
    c. a laterally flexed spring secured to said latch:
    d. a friction pad connected to said spring in spaced relation to the axis of said shaft; and
    e. a friction shoe slidably engaged by said friction pad with the laterally flexed spring providing the braking pressure of said friction pad against said friction shoe, said shaft being movable by pressure on said foot pedal.

4. In a control mechanism for the hydrostatic transmission of a tractor including a rocking foot pedal mounted on a shaft which is rotatably positioned by the foot pedal to alter the speed, direction and torque outputs of the transmission, the improvement comprising:
    a. a quadrant fixed to said shaft;
    b. a latch pivotally mounted on said shaft;
    c. means for selectively braking said latch;
    d. means for limiting the rotative position of said latch relative to said shaft; and
    e. means for releasably interconnecting said latch and said quadrant at a location spaced from said shaft; said latch and said quadrant moving coextensively when interconnected and when said shaft is rotated to effect motion of the tractor; said braking means including means for overriding said braking of said latch by pressure on said foot pedal.

5. Apparatus according to claim 4 wherein said selective braking means includes a spring secured to said latch, said spring being flexed axially of said shaft, and a friction block secured to said spring and spaced from said shaft for sliding engagement with a braking surface, the flexure of said spring providing the braking force between said block and said braking surface, the distance between said friction block and the axis of said shaft exceeding the distance between said releasable interconnecting means and said shaft.

6. Apparatus according to claim 5 wherein said quadrant has a notch in its arcuate edge, and wherein said apparatus includes a tubular handle secured to the free end of said spring, a locking rod extending through said handle and having a lateral segment adjacent the arcuate edge of said quadrant, and selectively operable biasing means adjacent the upper end of said rod for urging the rod upward to seat said segment in said notch, the handle and quadrant thus being interconnected for coextensive movement.

7. A control mechanism for a driven hydrostatic transmission having an output member comprising: a rockable shaft having a neutral position; means connecting said shaft to the transmission for driving the output member at varying speeds in a first direction when the shaft is rotated different amounts in a pivotal range on one side of neutral, and driving the output member at varying speeds in a second direction when the shaft is rotated different amounts in a pivotal range on the opposite side of neutral; the improvement which comprises the combination of a pedal connected to said shaft for rocking the shaft in either pivotal range and past neutral, a control lever connected to said shaft for rocking said shaft in said pivotal ranges and past neutral, friction brake means including a first portion on the free end portion of said shaft for frictionally holding said shaft in a desired preselected position when said shaft has been rotated in one of said pivotal ranges away from neutral, and wherein the holding capacity of said friction brake means can be overridden to reposition said shaft by actuation of said pedal when the shaft is being pivoted in only one of said pivotal ranges on one side of neutral.

8. An apparatus according to claim 7 wherein said shaft is adjusted into said preselected position by actuation of said pedal.

9. An apparatus according to claim 7 wherein said shaft is adjusted into said preselected position by acuation of said lever.

10. An apparatus according to claim 7 and additionally including abutment means engageable by said control lever for precluding movement of said shaft by said foot pedal from one of said pivotal ranges past neutral into said pivotal range on the opposite side of neutral.

11. An apparatus according to claim 7 and additionally comprising means for releasably connecting said control lever to said shaft, and wherein actuation of said foot pedal is effective to move said shaft in said pivotal ranges on either side of neutral when said releasable connecting means is released.

12. An apparatus according to claim 7 and additionally including means for deactivating said brake means when said control lever is in said pivotal ranges on said opposite side of neutral.

13. A control mechanism for a driven hydrostatic transmission having an output member comprising: a rockable shaft having a neutral position; means connecting said shaft to the transmission for driving the output member at varying speeds in a first direction when the shaft is rotated different amounts in one direction past neutral, and for driving the output member at varying speeds in a second direction when the shaft is rotated different amounts past neutral in the opposite direction; a pedal connected to said shaft for rocking the shaft in either direction; a control lever journaled on said shaft; means for selectively latching or unlatching said lever from said shaft; friction means secured to the free end of said lever; means defining a friction braking surface adjacent said friction means; and resilient means for urging said friction means against said friction surface to maintain said shaft in any one of an infinite number of positions when said lever is latched to said shaft and said shaft has been rotated past neutral in one of said direction, said friction surface and said friction means preventing movement of said shaft unless pressure is applied to said foot pedal.

14. In a control mechanism for the hydrostatic transmission of a tractor of the type including a rocking foot pedal and a pedal support shaft rotatable by actuation of said pedal to indirectly alter the output torque, driving direction and speed of said transmission, the improvement comprising:
  a. a rod pivotally connected to said support shaft;
  b. means for releasably connecting said rod to said support shaft for movement therewith;
  c. a friction pad carried by said rod; and
  d. a fixed braking surface slidably engaged by said friction pad for braking said support shaft to retain a given rotative position of said shaft when said foot pedal is released, said shaft being movable by pressure on said foot pedal.

\* \* \* \* \*